(12) United States Patent  
Patil (10) Patent No.: US 9,348,614 B2
(45) Date of Patent: May 24, 2016

(54) VERIFICATION OF SHARED DISPLAY INTEGRITY IN A DESKTOP SHARING SYSTEM

(75) Inventor: Dipak Patil, Miraj (IN)

(73) Assignee: SALESFORCE.COM, INC., San Francisco, CA (US)

( * ) Notice: Subject to any disclaimer, the term of this patent is extended or adjusted under 35 U.S.C. 154(b) by 266 days.

(21) Appl. No.: 13/414,432

(22) Filed: Mar. 7, 2012

(65) Prior Publication Data

US 2013/0238684 A1    Sep. 12, 2013

(51) Int. Cl.
   *G06F 15/16*   (2006.01)
   *G06F 9/44*   (2006.01)

(52) U.S. Cl.
   CPC .................................. *G06F 9/4445* (2013.01)

(58) Field of Classification Search
   CPC .... G06F 15/16; H04L 29/08072; H04L 29/06
   USPC ....................................................... 709/203
   See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |

(Continued)

*Primary Examiner* — Vivek Srivastava
*Assistant Examiner* — Sibte Bukhari
(74) *Attorney, Agent, or Firm* — Ingrassia Fisher & Lorenz, P.C.

(57) ABSTRACT

A system and related operating methods that achieve shared screen verification are presented here. One operating method begins by establishing a desktop sharing session between a publisher device and a viewer device, during which the publisher device renders a publisher display and the viewer device renders a viewer display that corresponds to the publisher display. The method continues by capturing first framebuffer data for a frame of the publisher display, capturing second framebuffer data for the corresponding frame of the viewer display. The method processes the first framebuffer data and/or the second framebuffer data to obtain processed framebuffer data having a consistent display resolution. Thereafter, the method compares the processed second framebuffer data to the processed first framebuffer data to obtain a measure of quality.

13 Claims, 5 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2013/0125009 A1* | 5/2013 | DeLuca et al. ............ 715/740 |
| 2013/0159880 A1* | 6/2013 | Bhogal et al. ............ 715/753 |

* cited by examiner

VERIFICATION OF SHARED DISPLAY INTEGRITY IN A DESKTOP SHARING SYSTEM

TECHNICAL FIELD

Embodiments of the subject matter described herein relate generally to computer and network systems that support desktop sharing between remote participants. More specifically, the subject matter relates to a methodology for testing and verifying the quality and integrity of a shared display.

BACKGROUND

Desktop sharing applications are known in the art. A desktop sharing application allows one user (the "Publisher") to share his or her monitor screen with one or more remote users (the "Viewers") via a network architecture such as the Internet. The Publisher and the Viewers are typically required to install software, a plug-in, or other code that accommodates that desktop sharing functionality. When activated, the Viewers are able to see the content and display of the Publisher's monitor in substantially real time.

Display quality can vary from one sharing session to another, due to software incompatibilities, encoding/decoding errors or issues, quality of service associated with the data communication network, and the like. Display quality may also be compromised when the Publisher screen size is adjusted to accommodate the Viewer screen size. Poor or inadequate display quality can result in distortion, dark spots, or splotches perceived at the Viewer display element.

Accordingly, it is desirable to have a technique for diagnosing and verifying the quality and integrity of a shared display in a desktop sharing environment. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The exemplary embodiments presented here relate to a computer-implemented desktop sharing system, which may be deployed with desktop computers, laptop computers, mobile devices, or the like. The system utilizes a shared screen verification application to verify/test the quality and integrity of a shared display.

Many people use a desktop sharing and display feature during live meetings with remote participants, and sometimes throughout the day for normal day to day activities. A desktop sharing application allows users of remote viewer devices to view the display of a host publisher device in substantially real time. For a variety of reasons, the quality and reliability of the shared display content may vary from system to system, from one device platform to another, and/or from one operating scenario to another. In addition, the quality and integrity of the shared display may be determined or affected by the application or software being used at the publisher device. Accordingly, there is a need for an automated verification of the visual display that is shared between a publisher device and viewer devices. One approach involves the publisher device using some heuristics to capture the content of the publisher display. This approach, however, does not capture the display content at the video framebuffer level. Moreover, this approach merely obtains updates of display screen changes; it does not obtain and process the video data in a frame-by-frame manner at all times. In addition, there will usually be some encoding and decoding errors in the captured data.

Some software applications cannot be properly captured by a publisher device during a desktop sharing session. For example, software applications may have limitations or might otherwise be incompatible with certain desktop sharing applications. Unfortunately, it is very difficult to keep track of which software applications are compatible and which cannot be captured by a publisher device, due to the extremely large number of software applications available for use at any given time, and due to the frequent updating of existing software products, where the impact of such updating on desktop sharing quality is unknown. In practice, therefore, it is virtually impossible to accurately predict which software applications will be incompatible with a particular desktop sharing application.

If the publisher device is running a software application that is not fully compatible with the desktop sharing application, then the user of the viewer device may experience poor shared display quality, typically characterized by visible splotches, graphics artifacts, or image distortion. Unfortunately, these display errors cannot be detected manually. Accordingly, the exemplary embodiments presented here relate to an automated approach for verifying the quality and integrity of a shared display screen.

In accordance with one exemplary embodiment, automated screen verification is performed by capturing the display of the publisher device at the video framebuffer level. The automated screen verification process continues by capturing the corresponding shared display of the viewer device at the video framebuffer level. Ideally, the two captured screens will convey the same and identical video content at all times. In practice, however, the display rendered by the viewer device may not be identical in quality and content.

The exemplary embodiment of the system described here adjusts the dimensions (resolution) of the captured publisher device framebuffer data to match the dimensions of the viewer device display. Thereafter, the adjusted publisher screen and the captured viewer screen are processed into defined small regions (e.g., 4-by-4 pixel regions). In practice, individual pixel-by-pixel comparison is not realistic due to lossy encoding techniques that result in different data (at the individual pixel level) after decoding. The small regions are then subjected to a comparison routine (e.g., a fuzzy compare algorithm) to determine a measure of how well they match. If the metric is above a defined threshold value, then the region is marked or otherwise identified as a "good" region. Otherwise, the region can be marked as a "bad" region.

A similar procedure is performed on larger and larger regions, with respective scoring thresholds, to determine whether or not the larger regions are good or bad. A combined or derived score can also be generated for the larger regions, if so desired. For example, the individual scores of the smaller regions could be added to arrive at a sum for a larger region that includes a plurality of the smaller regions. This allows the system to produce and collect scores at multiple levels. The scoring methodology is designed in a way that detects splotches, failures, and poor quality characteristics of the shared screen.

The automated technique can be used on a daily basis to enable the system to detect uncaptured applications as they are released and/or updated. Moreover, the shared screen verification procedure can be performed concurrently with a desktop sharing session to detect and report occurrences of shared screen quality degradation in substantially real time. This enables the system to respond quickly to detect which, if any, applications might be unsuitable for desktop sharing.

Figure 1:
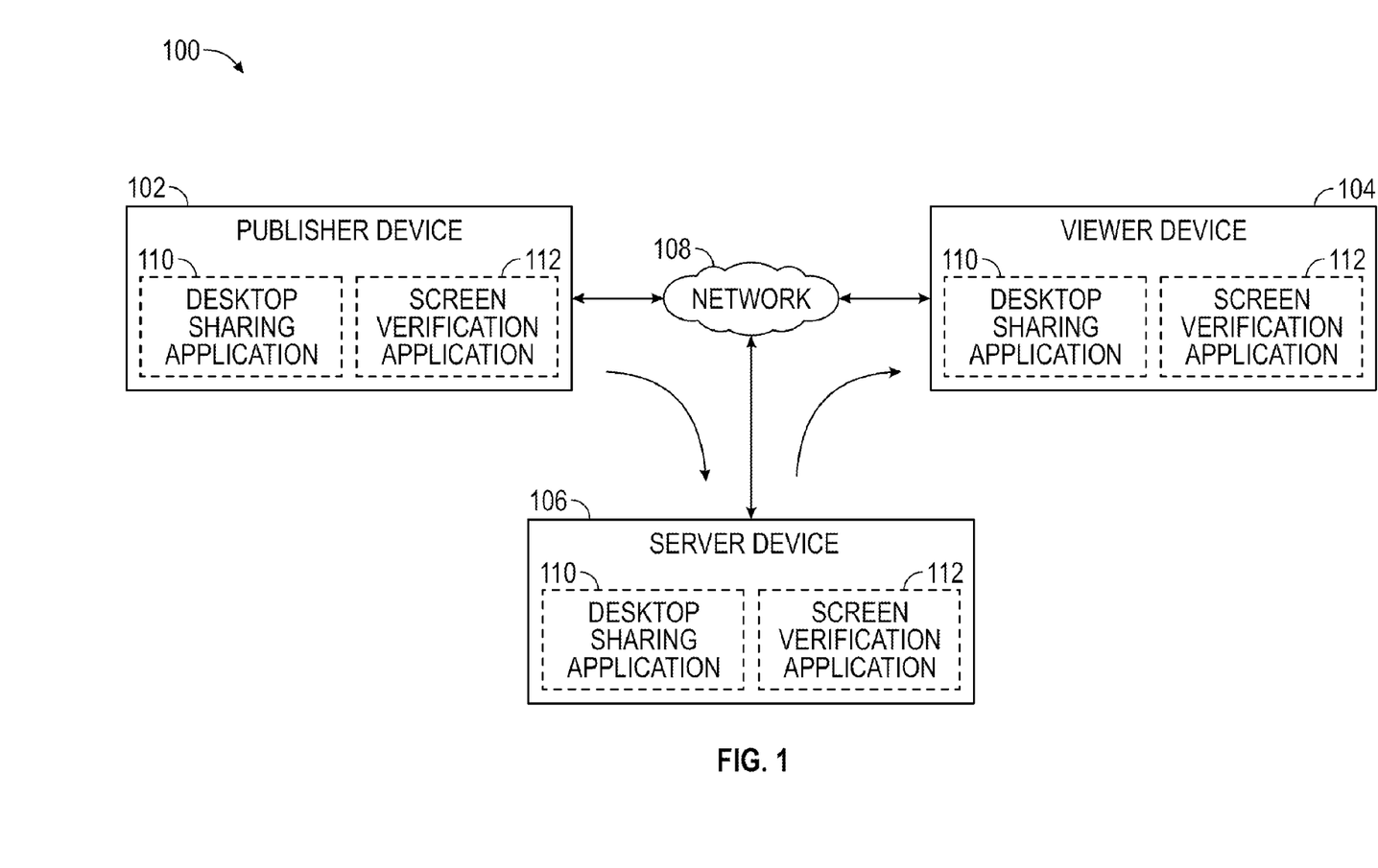
FIG. 1 is a schematic representation of an exemplary embodiment of a computer-implemented system capable of supporting a desktop sharing application.

FIG. 1 is a schematic representation of an exemplary embodiment of a computer-implemented system 100 that is capable of supporting a desktop sharing application. This particular embodiment of the system 100 includes a publisher device 102, at least one viewer device 104 (only one is shown for simplicity), and a server device, infrastructure, system, or architecture 106. These primary components of the system 100 may communicate with one another using a suitably configured data communication network 108, such as a local area network (LAN), a wide area network (WAN), the Internet, or the like. The system 100 is preferably realized as a computer-implemented system in that the publisher device 102, the viewer device 104, and the server device 106 are computer-based or processor-based electronic devices. Accordingly, each of these main components can be realized using well known computer hardware, software applications, processing logic, and the like. For example, the publisher device 102 and the viewer device 104 may be implemented in any of the following forms, without limitation: a desktop computer; a laptop, tablet, netbook or other portable computer; a mobile device such as a smartphone; a video game device; a digital media player; or a personal digital assistant. The components of the system 100 are suitably configured, programmed, and designed to accommodate the various display, networking, data communication, and data processing features and functions that are needed to support the operation of the system 100 as described in detail here.

The publisher device 102 represents the device that is sharing its display with the viewer device 104. Conversely, the viewer device 104 represents the device that is able to view the shared screen provided by the publisher device 102. In certain embodiments, the publisher device 102 communicates "directly" with the viewer device 104 via the data communication network 108. In such embodiments, the publisher device 102 may send virtual display data, control commands and instructions, framebuffer data, and other information to the viewer device 104 as needed.

The server device 106 is communicatively coupled between the publisher device 102 and the viewer device 104, and the server device 106 can be deployed in various embodiments of the system 100 to manage, handle, and/or serve some or all of the display sharing functionality and/or some or all of the shared screen verification functionality. In practice, therefore, the server device 106 may be realized as a computer-implemented or computer-based system having the hardware, software, firmware, and/or processing logic needed to carry out the various processes, techniques, and methodologies described in more detail herein. The server device 106 can be used as an interface between the publisher device 102 and the viewer device 104. In this regard, the publisher device 102 may send data (e.g., virtual display data, control commands and instructions, and framebuffer data) to the server device 106, which in turn may send the data to the viewer device 104. Moreover, if the server device 106 is used to perform the shared screen verification procedure, then the publisher device 102 and the viewer device 104 may send respective data (e.g., virtual display data, control commands and instructions, and framebuffer data) to the server device 106 for centralized processing and handling in the manner described herein.

It should be appreciated that the server device 106 need not be deployed in embodiments where the publisher device 102 and the viewer device 104 cooperate to perform the desired functionality. Indeed, in certain preferred implementations, the shared screen verification functionality is resident primarily (or exclusively) at the viewer device 104.

The data communication network 108 provides and supports data connectivity between the publisher device 102, the viewer device 104, and the server device 106. In practice, the data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Each of the main components depicted in FIG. 1 may include or cooperate with a suitably configured desktop sharing application 110 that supports the desktop sharing techniques, technologies, and functions described here. The desktop sharing application 110 may be realized as a computer-readable program having appropriate computer-executable instructions that are written in accordance with the desired functionality described here. The desktop sharing application 110 resident at the publisher device 102 and the desktop sharing application 110 resident at the viewer device 104 are responsible for initiating and maintaining desktop sharing sessions between the publisher device 102 and the viewer device 104. In some embodiments, the desktop sharing application 110 resident at the server device 106 may also be used to establish and maintain a desktop sharing session. Notably, the desktop sharing application 110 can be utilized to establish and maintain a designated data communication connection between the publisher device 102 and the viewer device 104, where the data communication connection is used to support desktop sharing. Accordingly, this designated data communication connection can be used to transfer virtual display data from the publisher device 102 to the viewer device 104. In practice, the designated data communication connection may include or be associated with a suitable transport layer (e.g., Secure Sockets Layer) or a suitable transfer protocol such as the Hypertext Transfer Protocol.

Each of the main components depicted in FIG. 1 may also include or cooperate with a suitably configured shared screen verification application 112 that supports the shared screen verification techniques, technologies, and functions described here. The shared screen verification application 112 may be realized as a computer-readable program having appropriate computer-executable instructions that are written in accordance with the desired functionality described here. In certain embodiments, the shared screen verification application 112 and the desktop sharing application 110 are different, distinct, and separate applications. In alternative embodiments, some or all of the shared screen verification application 112 could be integrated with the desktop sharing application 110. In operation, the shared screen verification application 112 can be utilized to establish and maintain a second data communication connection between the publisher device 102 and the viewer device 104, where the second data communication connection is used to support the shared screen verification functionality. Accordingly, the second data communication connection (which may be different, distinct, and separate from the designated data communication connection that is used to support the desktop sharing functionality) can be used to transfer framebuffer data obtained from the publisher device 102 and/or from the viewer device 104. Additional details of the shared screen verification feature are presented below with reference to FIGS. 3-6.

Figure 2:
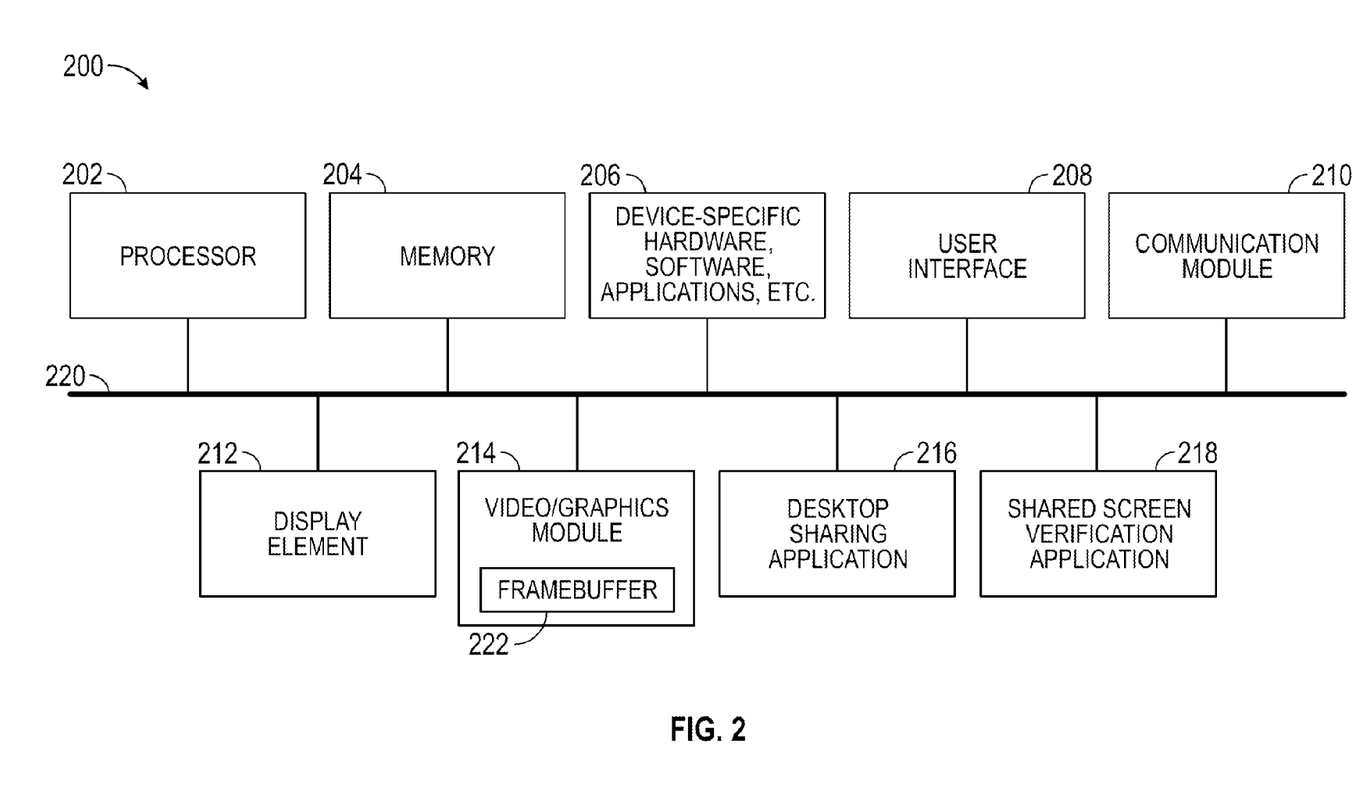
FIG. 2 is a schematic representation of an exemplary embodiment of a computer-implemented device that is suitable for use in a system such as that depicted in FIG. 1.

FIG. 2 is a schematic representation of an exemplary embodiment of an apparatus, system, or device 200 suitable for use in a system such as that depicted in FIG. 1. In practice, the publisher device 102, the viewer device 104, and the server device 106 could be generally configured and implemented as shown in FIG. 2. Thus, the following general description of the device 200 may be applicable to any of the main components of the system 100 shown in FIG. 1.

The illustrated embodiment of the device 200 includes, without limitation: at least one processor 202; a suitable amount of memory 204; device-specific hardware, software, firmware, and/or applications 206; a user interface 208; a communication module 210; a display element 212; a video/graphics module 214; a desktop sharing application 216; and a shared screen verification application 218. Of course, the device 200 may include additional elements, components, modules, and functionality configured to support various features that are unrelated to the subject matter described here. For example, the device 200 may include certain features and elements to support conventional functions that might be related to the particular implementation and deployment of the device 200. In practice, the elements of the device 200 may be coupled together via a bus or any suitable interconnection architecture 220.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. The memory 204 can be used to store computer-readable media, where a tangible computer-readable medium has computer-executable instructions stored thereon (accordingly, the computer-readable medium is typically non-transitory in nature). The computer-executable instructions, when read and executed by the device 200, cause the device 200 to perform certain tasks, operations, functions, and processes described in more detail herein. In this regard, the memory 204 may represent one suitable implementation of such computer-readable media. Alternatively or additionally, the device 200 could receive and cooperate with computer-readable media (not separately shown) that is realized as a portable or mobile component or platform, e.g., a portable hard drive, a USB flash drive, an optical disc, or the like.

The device-specific hardware, software, firmware, and applications 206 may vary from one embodiment of the device 200 to another. For example, the device-specific hardware, software, firmware, and applications 206 will support telephone functions and features when the device 200 is realized as a mobile telephone, conventional personal computer functions and features if the device 200 is realized as a desktop or portable computer, and server functions and features if the device 200 is realized as a server device (including, in certain embodiments, web server functionality). In practice, certain portions or aspects of the device-specific hardware, software, firmware, and applications 206 may be implemented in one or more of the other blocks depicted in FIG. 2.

The user interface 208 may include or cooperate with various features to allow a user to interact with the device 200. Accordingly, the user interface 208 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 200. In various embodiments, the user interface 208 may include one or more graphical user interface (GUI) control elements that enable a user to manipulate or otherwise interact with an application via the display element 212.

The communication module 210 facilitates data communication between the device 200 and other components as needed during the operation of the device 200. In the context of this description, the communication module 210 can be employed during a desktop sharing session that includes the device 200 as one of the participant devices. Thus, the communication module 210 may be responsible for providing virtual display data from the publisher device to the viewer devices (and/or to a server device). The communication module 210 may also be responsible for providing framebuffer data from the device 200 to another device or a server in the system. An embodiment of the device 200 may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

The display element 212 is suitably configured to enable the device 200 to render and display various screens, GUIs, GUI control elements, drop down menus, auto-fill fields, text entry fields, message fields, or the like. Of course, the display element 212 may also be utilized for the display of other information during the operation of the device 200, as is well understood. Notably, the specific configuration, operating characteristics, size, resolution, and functionality of the display element 212 can vary depending upon the practical implementation of the device 200. For example, if the device 200 is a desktop computer, then the display element 212 may be a relatively large monitor. Alternatively, if the device 200 is a cellular telephone device, then the display element 212 may be a relatively small integrated display screen, which may be realized as a touch screen.

The display resolution of the display element 212 may vary from one embodiment of the device 200 to another. In practice, therefore, a publisher device may have a native display resolution that is different than the native display resolution of the viewer device. Accordingly, resizing techniques may need to be applied to the publisher display data to support the native resolution of the viewer display, as is well understood.

The video/graphics module 214 may refer to hardware, software, firmware, and/or processing logic that supports various video processing and display rendering technologies utilized by the system described herein. In certain implementation, the video/graphics module 214 may include, cooperate with, or be realized as a video card or an equivalent component of the device 200. Accordingly, the video/graphics module 214 may be designed to perform video processing, graphics processing, and image rendering as needed during operation of the device, using a variety of well-established operating techniques and protocols. In this regard, the video/graphics module 214 may include or cooperate with a graphics processor, a video controller, and the like. In addition, the video/graphics module 214 includes or cooperates with a video framebuffer 222. The framebuffer 222 may be realized with an appropriate amount of memory (typically RAM) that is sufficient to store at least one full frame of video data. As used here, the content of the framebuffer 222 may be referred to as "framebuffer data." In practice, the framebuffer data corresponds to the pixel-based information that is used to render the display for the device 200.

The desktop sharing application 216 may refer to hardware, software, firmware, and/or processing logic that supports one or more desktop (display) sharing technologies utilized by the system described herein (note that the desktop sharing application 216 may correspond to any of the instantiations of the desktop sharing application 110 shown in FIG. 1). Desktop sharing techniques and technologies are well known and, therefore, the basic operating principles of the desktop sharing application 216 will not be described in detail here. Generally, the desktop sharing application 216 is suitably designed to initiate, maintain, and manage desktop sharing sessions between a publisher device and one or more viewer devices, using any number of data communication connections and data communication networks as needed. A desktop sharing session allows each designated viewer device to view the desktop display of the publisher device in approximately real-time (subject to practical latencies exhibited by the data communication connections, networks, and device technology). Thus, the publisher device shares its display with the viewer devices by providing virtual display data to the viewer devices. The viewer devices receive the virtual display data, process the virtual display data using local resources and the respective instantiations of the desktop sharing application 216, and render a virtual or simulated version of the publisher's desktop using the respective display elements of the viewer devices.

The desktop sharing application 216 may also be responsible for establishing, maintaining, and tearing down the various data communication connections between the publisher device and the different viewer devices. In certain embodiments, the desktop sharing application 216 may establish, maintain, and tear down data communication connections with one or more server devices (see FIG. 1).

The shared screen verification application 218 may refer to hardware, software, firmware, and/or processing logic that supports the various shared screen verification, diagnostic, and testing procedures described herein (note that the shared screen verification application 218 may correspond to any of the instantiations of the shared screen verification application 112 shown in FIG. 1). As mentioned above, the shared screen verification application 218 may be provided as a separate, distinct, and different application, relative to the desktop sharing application 216. In certain embodiments, the shared screen verification application 218 is resident at a server device that is coupled between the publisher device and the viewer device. In other embodiments, the shared screen verification application 218 is resident at the viewer device. The operations, functions, and processes carried out by the shared screen verification application 218 are described in more detail below with reference to FIGS. 3-6.

Figure 3:
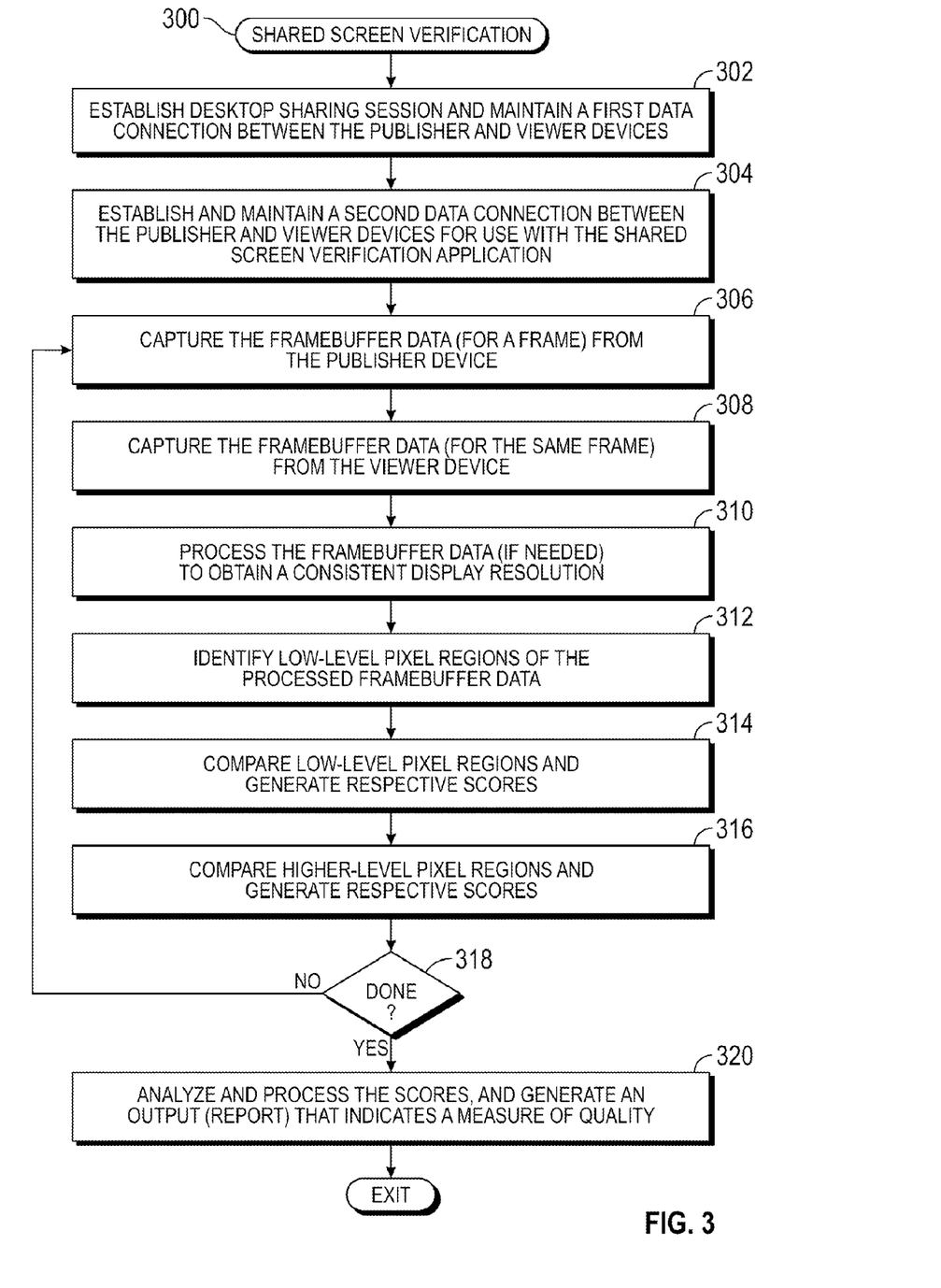
FIG. 3 is a flow chart that illustrates an exemplary embodiment of a shared screen verification process.

FIG. 3 is a flow chart that illustrates an exemplary embodiment of a shared screen verification process 300 that may be performed by the system 100 (see FIG. 1) or by one or more devices in the system 100, such as the device 200 (see FIG. 2). The various tasks performed in connection with the process 300 may be performed by software, hardware, firmware, or any combination thereof. For illustrative purposes, the following description of the process 300 may refer to elements mentioned above in connection with FIG. 1 and FIG. 2. In practice, portions of the process 300 may be performed by different elements of the described system, e.g., a server device, a viewer device, a publisher device, or various components thereof. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The illustrated embodiment of the process 300 begins by establishing a desktop sharing session between a publisher device and a viewer device (task 302). In practice, a user of the publisher device can launch the desktop sharing application, identify the viewer device and/or the user of the viewer device, and invite or otherwise prompt the user of the viewer device to join the desktop sharing session. The process 300 establishes a first data communication connection between the publisher device and the viewer device. This first data communication connection is used to support the desktop sharing session by conveying virtual display data that allows the viewer device to render the display of the publisher device in an ongoing manner. Thus, during the desktop sharing session the publisher device renders its own display (i.e., the publisher display), and the viewer device responds by rendering a viewer display that tracks and corresponds to the publisher display.

During the desktop sharing session, the user of the publisher device can work on various applications, access folders, open files, navigate the file system, and the like. In real-time (or substantially real-time for practical purposes), the display element of the viewer device renders the publisher screen such that the user of the viewer device can see exactly what the user of the publisher device sees. This particular embodiment of the process 300 assumes that shared screen diagnostics are performed during the shared desktop session to monitor, grade, or check the quality and integrity of the viewer device's display. Accordingly, the process 300 may continue by establishing and maintaining a second data communication connection between the publisher device and the viewer device (task 304). Notably, the second data communication connection is different than, and distinct from, the first data communication connection. The second data communication connection is utilized to transfer framebuffer data, which in turn is used to check the quality of the shared display. This particular embodiment assumes that the viewer device performs the shared screen analysis and, therefore, the second data communication connection represents a data link that provides the framebuffer data of the publisher device to the viewer device. In alternative embodiments where the shared screen analysis is performed by a server device, second data communication connections may be established between the publisher device and the server device, and between the viewer device and the server device. Such an arrangement allows the server device to obtain the framebuffer data from both the publisher device and the viewer device.

The process 300 continues by capturing the current framebuffer data from the framebuffer of the publisher device (task 306). The captured framebuffer data represents the pixel data for the entirety of a frame. For this exemplary embodiment, task 306 is performed by the viewer device, and the publisher device's framebuffer data is provided by the publisher device (and received by the viewer device) via the second data communication connection. In an alternative embodiment where a server device performs the bulk of the shared screen verification, the publisher device's framebuffer data is captured by the server device. In yet another embodiment where the publisher device performs the bulk of the shared screen verification, the publisher device's framebuffer data can be accessed locally by the shared screen verification application resident at the publisher device.

Notably, the publisher device's framebuffer data is captured separately by the shared screen verification application. In other words, the capturing performed during task 306 is not associated with the normal operation of the desktop sharing application. The particular frame that is captured at this time is indexed or otherwise identified in an appropriate manner to allow the process 300 to perform the diagnostic test. For example, the framebuffer data may include or be accompanied by a frame identifier, a time stamp, or metadata that corresponds to the current frame.

The process 300 also captures the corresponding framebuffer data from the framebuffer of the viewer device (task 308). The framebuffer data captured from the viewer device represents the pixel data for the same identified frame. In other words, the video/image content of the frame of the viewer display corresponds to the video/image content of the frame of the publisher display. For this exemplary embodiment, task 308 is performed at the viewer device. Accordingly, task 308 may be associated with the viewer device accessing its own video framebuffer to directly receive the framebuffer data corresponding to the designated frame. Thus, the framebuffer data obtained during task 308 is already available at the viewer device for this particular embodiment. In an alternative embodiment where a server device performs the bulk of the shared screen verification, the viewer device's framebuffer data is captured by the server device. In yet another embodiment where the publisher device performs the bulk of the shared screen verification, the viewer device's framebuffer data can be captured by the publisher device via the second data communication connection.

Notably, the viewer device's framebuffer data is captured separately by the shared screen verification application. In other words, the capturing performed during task 308 is not associated with the normal operation of the desktop sharing application. The particular viewer device frame that is captured at this time is indexed or otherwise identified in an appropriate manner to allow the process 300 to "match" the framebuffer data of the viewer device to the corresponding framebuffer data of the publisher device. As explained above, the framebuffer data of the viewer device may include or be accompanied by a frame identifier, a time stamp, or metadata that corresponds to the current frame.

The display resolution of the publisher device need not be identical to the display resolution of the viewer device. Accordingly, the process 300 may adjust the framebuffer data to obtain a similar or identical display resolution to accommodate the shared screen verification procedure. In this regard, the process 300 may continue by processing the viewer device's framebuffer data, the publisher device's framebuffer data, or both, to obtain processed framebuffer data that exhibits a consistent or common display resolution (task 310). In other words, the process 300 may resize the viewer device's framebuffer data and/or the publisher device's framebuffer data as needed so that the two corresponding video frames can be efficiently compared in an intelligent and meaningful manner. This allows the process 300 to compare the quality of the shared display, which is rendered at the viewer device, against the "reference" display, which is rendered at the publisher device.

For this example, task 310 is performed at the viewer device. In alternative embodiments, task 310 could be performed at the publisher device or at a server device. Task 310 results in processed (i.e., potentially resized) framebuffer data. It should be appreciated that this description refers to the "processed framebuffer data" that results from task 310, whether or not any framebuffer data is actually altered. In practice, the publisher device's framebuffer data or the viewer device's framebuffer data could remain unchanged. Nonetheless, such unchanged framebuffer data is still considered "processed framebuffer data" for purposes of this description. Indeed, in certain embodiments the framebuffer data having the smallest display resolution may be treated as the reference framebuffer data, such that the framebuffer data having the larger display resolution is adjusted to downsize the resolution. In such embodiments, the framebuffer data having the smallest resolution need not be adjusted.

The process 300 may continue by comparing the processed framebuffer data of the viewer device to the processed framebuffer data of the publisher device. For this example, the comparison is performed at the viewer device. In alternative embodiments, the comparison could be performed at the publisher device or at a server device. The comparison is performed using certain metrics, algorithms, and/or logic to obtain a measure of quality for the shared display. Notably, this measure of quality may reflect a frame-by-frame determination that is based on the video/image information captured from the video framebuffers of the publisher device and the viewer device.

For this exemplary embodiment, the processed framebuffer data is compared by identifying or defining certain regions of the frame, and comparing the regions to obtain scores that indicate the shared display quality. For example, the process 300 may identify low-level pixel regions of the processed viewer device framebuffer data, along with corresponding low-level pixel regions of the processed publisher device framebuffer data (task 312). As used herein, a low-level pixel region represents an N-by-M pixel region of the processed framebuffer data, where N is a first nonzero positive integer, and M is a second nonzero positive integer (N and M may be the same or different, depending upon the embodiment). Low-level pixel regions are utilized by the process 300 to obtain an accurate assessment in an efficient manner (in contrast to a more rigorous technique that might perform a pixel-by-pixel comparison).

Figure 4:
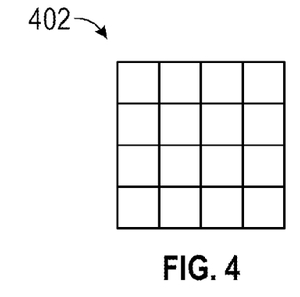
FIGS. 4-6 are diagrams that depict defined pixel regions of various sizes, which can be used during a shared screen verification process.

In practice, the process 300 may define any arbitrary pixel region as a "base" or "foundation" low-level pixel region, e.g., a four-by-four, two-by-two, four-by-two, or any suitable pixel region. FIG. 4 depicts one low-level pixel region 402 that includes sixteen pixels, where N=4 and M=4. At this stage of the process 300, the processed framebuffer data can be further processed to define or identify a plurality of low-level pixel regions that together occupy most if not all of the entire frame under analysis. This allows the process 300 to compare corresponding low-level pixel regions to one another, where the two low-level pixel regions under comparison correspond to a common display area for the publisher display and the viewer display.

The process 300 continues by comparing each low-level pixel region of the publisher frame to each corresponding low-level pixel region of the viewer frame (task 314). As a result of each comparison, task 314 determines a low-level score that indicates an extent to which the low-level pixel regions match. Ideally, a low-level pixel region in the publisher device's frame will be identical to the corresponding low-level pixel region in the viewer device's frame. Accordingly, if two low-level pixel regions match, then task 314 may generate a "passing" or a "good" score for that particular region. On the other hand, if the two low-level pixel regions differ by some threshold amount, then task 314 may generate a "failing" or "bad" score for that particular pixel region. Of course, any scoring approach and scoring threshold scheme could be used to make a decision regarding a comparison of low-level pixel regions. For instance, a score for a low-level pixel region may be expressed using any number of values selected from any domain (e.g., a numerical score between zero and ten). Regardless of the particular scoring or grading scheme utilized by the process 300, the resulting score is indicative of a measure of quality. In this regard, a reported measure of quality of the shared screen can be based at least in part on these low-level scores. The process 300 can perform this low-level pixel region comparison for any portion (or all) of the screen area defined by the framebuffer data.

In practice, the digital information associated with the pixel regions can be analyzed using any appropriate technique or scheme that results in a quantitatively measurable comparison score. For example, the process 300 may implement certain fuzzy comparison, approximation, or estimation techniques that efficiently analyze the pixel regions without having to perform a "brute force" bit-by-bit analysis. As another example, color averaging techniques could be utilized to compare pixel regions.

The illustrated embodiment of the process 300 continues by repeating the comparison and scoring for higher-level pixel regions (task 316). This may involve increasing the values of N and M to obtain larger pixel regions of the processed framebuffer data and, thereafter, determining supplemental (high-level) scores that indicate an extent to which the high-level pixel regions of the publisher device match the high-level pixel regions of the viewer device. In certain embodiments, the process 300 identifies or creates each high-level pixel region from at least two of the low-level regions. In other words, each high-level pixel region defined in the publisher device's processed framebuffer data is formed from a plurality of the low-level pixel regions defined in the publisher device's processed framebuffer data. Likewise, each high-level pixel region defined in the viewer device's processed framebuffer data is formed from a plurality of the low-level pixel regions defined in the viewer device's processed framebuffer data.

Figure 5:
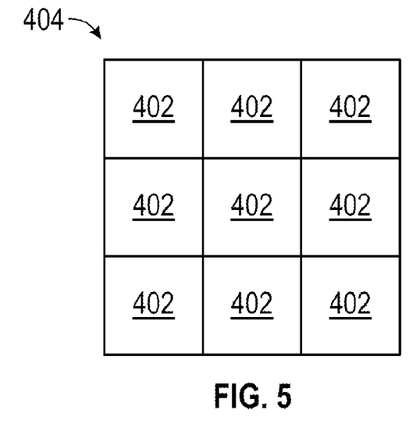
Figure 6:
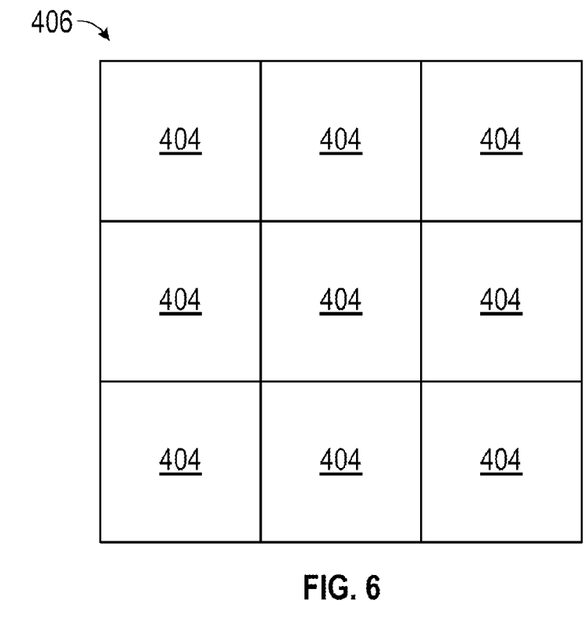

FIG. 5 depicts a high-level pixel region 404 that is created from nine adjacent low-level pixel regions 402. In other words, each high-level pixel region 404 includes a total of 144 pixels. It should be appreciated that the actual dimensions of a high-level pixel region may vary from one embodiment to another, and from one "level" to another if so desired. The process 300 may proceed in this manner to define and compare high-level pixel regions of increasing size, until an appropriate pixel region size has been reached, or until the display resolution cannot accommodate any larger pixel regions. For example, FIG. 6 depicts a high-level pixel region 406 that is created from nine adjacent high-level pixel regions 404. Accordingly, each high-level pixel region 406 includes a total of 1,296 pixels. Notably, respective scores for each high-level pixel region (and/or any combination thereof) can be generated and saved as the process 300 proceeds to higher and higher levels.

Each pair of high-level pixel regions can be analyzed as described above for the low-level pixel regions. As a result of each comparison, task 316 determines a respective high-level score that indicates an extent to which the high-level pixel regions match. Regardless of the particular scoring or grading scheme utilized by the process 300, a high-level score will be indicative of the measure of quality of the shared screen. In this regard, the reported measure of quality of the shared screen can be based at least in part on these high-level scores. The process 300 can perform the high-level pixel region comparison for any portion (or all) of the screen area defined by the framebuffer data.

The process 300 may repeat the comparison and scoring for any number of frames, and in an ongoing real-time manner during operation of the desktop sharing session. If additional frames are to be analyzed (the "No" branch of query task 318), then the process 300 may return to task 306 to capture the next frame and to proceed as described above. If, however, no additional frames are to be analyzed (the "Yes" branch of query task 318), then the process 300 may collect, analyze, and process the scores and generate a suitable output that indicates the measure of quality in some human-readable format (task 320). It should be appreciated that the measure of quality need not be based on each and every score (low-level, high-level, or other type of score) generated during the process 300. Rather, the measure of quality could be based on any individual score, any subset of scores, or any combination of scores, as appropriate to the particular embodiment.

The measure of quality can be presented in any human-understandable form that conveys the quality of the shared screen display, the integrity of the shared screen, or the like. In certain embodiments, task 320 produces a report, a chart, a spread sheet, a visual representation, or statistics that can be used to determine or verify whether or not the desktop sharing application is providing an acceptable shared screen for the particular software or application that is being rendered.

The exemplary embodiments presented here relate to various computer-implemented and computer-executed techniques related to desktop sharing and verification of the quality of shared displays. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database environment.

Figure 7:
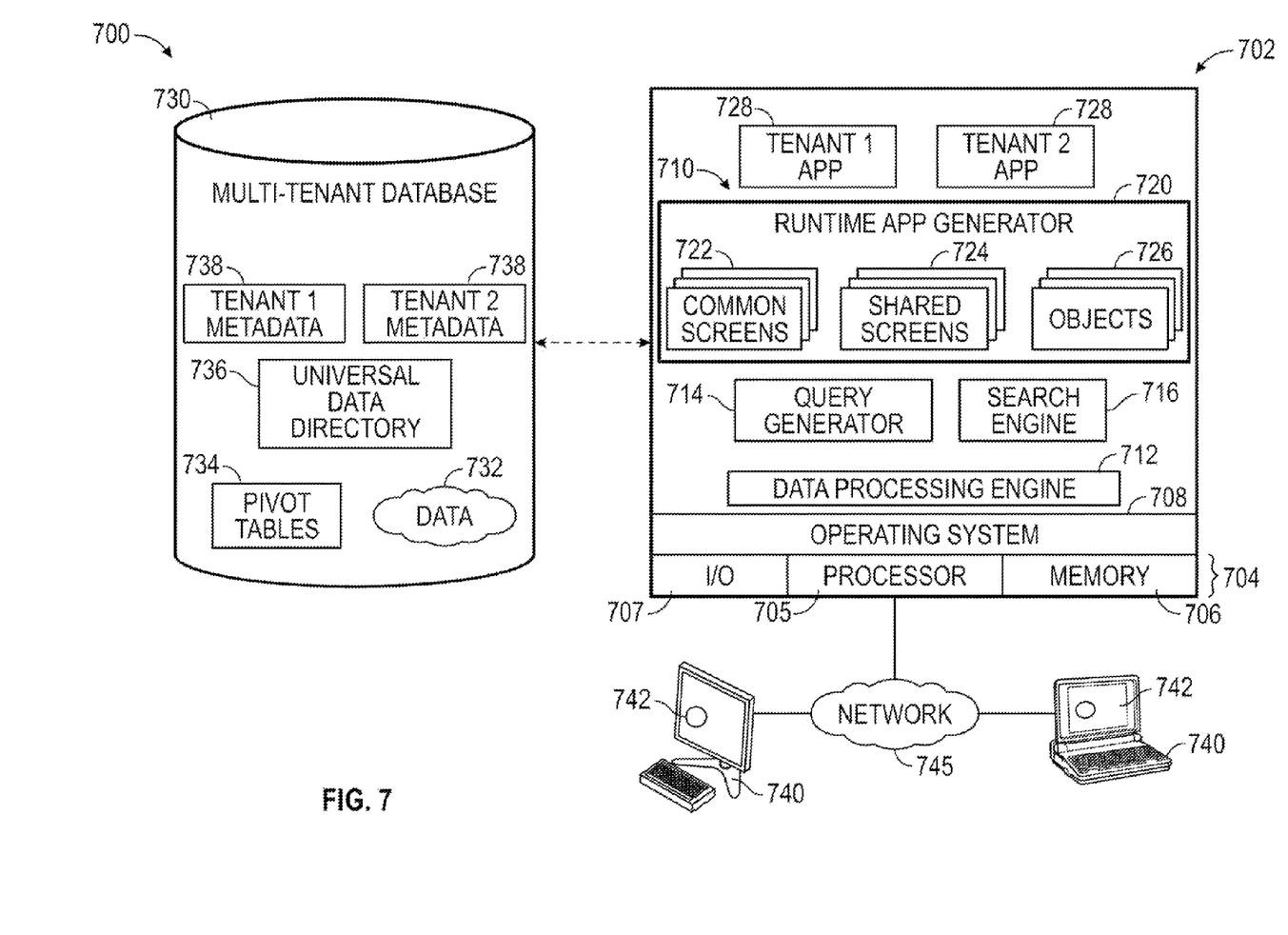
FIG. 7 is a schematic representation of an exemplary embodiment of a multi-tenant application system.

In this regard, an exemplary embodiment of a multi-tenant application system 700 is shown in FIG. 7. The system 700 suitably includes a server 702 that dynamically creates virtual applications 728 based upon data 732 from a common database 730 that is shared between multiple tenants. Data and services generated by the virtual applications 728 are provided via a network 745 to any number of user devices 740, as desired. Each virtual application 728 is suitably generated at run-time using a common application platform 710 that securely provides access to the data 732 in the database 730 for each of the various tenants subscribing to the system 700. In accordance with one non-limiting example, the system 700 may be implemented in the form of a multi-tenant CRM system that can support any number of authenticated users of multiple tenants.

A "tenant" or an "organization" generally refers to a group of users that shares access to common data within the database 730. Tenants may represent customers, customer departments, business or legal organizations, and/or any other entities that maintain data for particular sets of users within the system 700. Although multiple tenants may share access to the server 702 and the database 730, the particular data and services provided from the server 702 to each tenant can be securely isolated from those provided to other tenants. The multi-tenant architecture therefore allows different sets of users to share functionality without necessarily sharing any of the data 732.

The database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein.

The data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. The server 702 operates with any sort of conventional processing hardware 704, such as a processor 705, memory 706, input/output features 707 and the like. The processor 705 may be implemented using one or more of microprocessors, microcontrollers, processing cores and/or other computing resources spread across any number of distributed or integrated systems, including any number of "cloud-based" or other virtual systems. The memory 706 represents any non-transitory short or long term storage capable of storing programming instructions for execution on the processor 705, including any sort of random access memory (RAM), read only memory (ROM), flash memory, magnetic or optical mass storage, and/or the like. The server 702 typically includes or cooperates with some type of computer-readable media, where a tangible computer-readable medium has computer-executable instructions stored thereon. The computer-executable instructions, when read and executed by the server 702, cause the server 702 to perform certain tasks, operations, functions, and processes described in more detail herein. In this regard, the memory 706 may represent one suitable implementation of such computer-readable media. Notably, the processor 705 and the memory 706 may be suitably configured to carry out some of the various shared screen verification and network-based features described above.

The input/output features 707 represent conventional interfaces to networks (e.g., to the network 745, or any other local area, wide area or other network), mass storage, display devices, data entry devices and/or the like. In a typical embodiment, the application platform 710 gains access to processing resources, communications interfaces and other features of the processing hardware 704 using any sort of conventional or proprietary operating system 708. As noted above, the server 702 may be implemented using a cluster of actual and/or virtual servers operating in conjunction with each other, typically in association with conventional network communications, cluster management, load balancing and other features as appropriate.

The application platform 710 is any sort of software application or other data processing engine that generates the virtual applications 728 that provide data and/or services to the user devices 740. The virtual applications 728 are typically generated at run-time in response to queries received from the user devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the user devices 740. The virtual applications 728 created by tenants are typically constructed in accordance with the tenant-specific metadata 738, which describes the particular tables, reports, interfaces and/or other features of the particular application. In various embodiments, each virtual application 728 generates dynamic web content (including GUIs, detail views, secondary or sidebar views, and the like) that can be served to a browser or other client program 742 associated with its user device 740, as appropriate.

The runtime application generator 720 suitably interacts with the query generator 714 to efficiently obtain multi-tenant data 732 from the database 730 as needed. In a typical embodiment, the query generator 714 considers the identity of the user requesting a particular function, and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user that initiated the request.

The data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc. In certain embodiments, the data processing engine 712 and the processor 705 cooperate in an appropriate manner to perform and manage various techniques, processes, and methods associated with desktop sharing, as described previously with reference to FIGS. 1-6.

In operation, developers use the application platform 710 to create data-driven virtual applications 728 for the tenants that they support. Such virtual applications 728 may make use of interface features such as tenant-specific screens 724, universal screens 722 or the like. Any number of tenant-specific and/or universal objects 726 may also be available for integration into tenant-developed virtual applications 728. The data 732 associated with each virtual application 728 is provided to the database 730, as appropriate, and stored until it is requested or is otherwise needed, along with the metadata 738 that describes the particular features (e.g., reports, tables, functions, etc.) of that particular tenant-specific virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith. In an exemplary embodiment, each object type includes one or more fields for indicating the relationship of a respective object of that object type to one or more objects of a different object type (e.g., master-detail, lookup relationships, or the like).

In exemplary embodiments, the application platform 710, the data processing engine 712, the query generator 714, and the processor 705 cooperate in an appropriate manner to process data associated with a hosted virtual application 728 (such as a CRM application), generate and provide suitable GUIs (such as web pages) for presenting data on client devices 740. These elements could also be utilized to perform additional techniques, processes, and methods to support some of the features and functions related to desktop sharing and related shared screen verification features and functions for the hosted virtual application 728.

Still referring to FIG. 7, the data and services provided by the server 702 can be retrieved using any sort of personal computer, mobile telephone, portable device, tablet computer, or other network-enabled user device 740 that communicates via the network 745. Typically, the user operates a conventional browser or other client program 742 to contact the server 702 via the network 745 using, for example, the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. The query generator 714 suitably obtains the requested data 732 from the database 730 as needed to populate the tables, reports or other features of the particular virtual application 728. As noted above, the virtual application 728 may contain Java, ActiveX, or other content that can be presented using conventional client software running on the user device 740; other embodiments may simply provide dynamic web or other content that can be presented and viewed by the user, as desired.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible non-transitory processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. For example, although the above description assumes that the publisher device functions as the sharing device, the desktop sharing application could be designed to also allow a viewer device to share files/folders with another viewer device and/or with the publisher device, using the existing data communication connections. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of shared screen verification, comprising:
  establishing a desktop sharing session between a publisher device and a viewer device, during which the publisher device renders a publisher display and the viewer device renders a viewer display that corresponds to the publisher display;
  capturing, at a server device, first framebuffer data for a frame of the publisher display, wherein the first framebuffer data is captured from a first framebuffer at the publisher device and the first framebuffer data corresponds to pixel-based information used to render the frame at the publisher display;
  separately capturing, at the server device, second framebuffer data for a frame of the viewer display, wherein video content of the frame of the viewer display corresponds to video content of the frame of the publisher display, wherein the second framebuffer data is captured from a second framebuffer at the viewer device and the second framebuffer data corresponds to pixel-based information used to render the frame at the viewer display;
  based on the first framebuffer data differing in resolution from the second framebuffer data, adjusting, at the server device, resolution of the first framebuffer data, the second framebuffer data, or both the first framebuffer data and the second framebuffer data to generate processed first framebuffer data and processed second framebuffer data that exhibit a consistent display resolution so that the processed first framebuffer data and the processed second framebuffer data are capable of being compared to each other;
  defining one or more pixel regions of the frame that identify a common display area for the publisher display and the viewer display, wherein the defining comprises:
    identifying a first N-by-M pixel region of the processed first framebuffer data, wherein N is a nonzero positive integer, and wherein M is a nonzero positive integer: and
    identifying a second N-by-M pixel region of the processed second framebuffer data, wherein the first N-by-M pixel region and the second N-by-M pixel region correspond to a common display area for the publisher display and the viewer display; and
  determining, at the server device based on a matching analysis of the processed second framebuffer data for the defined pixel regions of the frame and the processed first framebuffer data for the defined pixel regions of the frame, a score that indicates shared screen display quality of the defined pixel regions of the frame rendered on the viewer display and the publisher display, wherein the score indicates an extent to which the second N-by-M pixel region of the processed second framebuffer data for the defined pixel regions of the frame match the first N-by-M pixel region of the processed first framebuffer data for the defined pixel regions of the frame.

2. The method of claim 1, wherein a desktop sharing application is executed by a processor to support the desktop sharing session, and further comprising:
  generating an output that indicates the shared screen display quality of the defined pixel regions of the frame rendered on the viewer display and the publisher display.

3. The method of claim 1, wherein:
  the first framebuffer of the publisher device comprises a first video framebuffer; and
  capturing the first framebuffer data comprises: receiving the first framebuffer data from the first video framebuffer.

4. The method of claim 1, wherein:
  the second framebuffer of the viewer device comprises a second video framebuffer; and
  separately capturing the second framebuffer data comprises: receiving the second framebuffer data from the second video framebuffer.

5. A method of shared screen verification, comprising:
  establishing a desktop sharing session between a publisher device and a viewer device, during which the publisher device renders a publisher display and the viewer device renders a viewer display that corresponds to the publisher display;
  capturing, from a video framebuffer of the publisher device, first framebuffer data for a frame of the publisher display, wherein the first framebuffer data corresponds to pixel-based information used to render the frame at the publisher display;
  separately capturing, from a video framebuffer of the viewer device, second framebuffer data for a frame of the viewer display, wherein video content of the frame of the viewer display corresponds to video content of the frame of the publisher display, wherein the second framebuffer data corresponds to pixel-based information used to render the frame at the viewer display;
  based on the first framebuffer data differing in resolution from the second framebuffer data, adjusting resolution of the first framebuffer data, the second framebuffer data, or both the first framebuffer data and the second framebuffer data to generate processed first framebuffer data and processed second framebuffer data, wherein the processed first framebuffer data and the processed second framebuffer data exhibit a consistent display resolution so that the processed first framebuffer data and the processed second framebuffer data are capable of being compared to each other;

defining one or more pixel regions of the frame that identify a common display area for the publisher display and the viewer display, comprising: identifying a first N-by-M pixel region of the processed first framebuffer data, wherein N is a nonzero positive integer, and wherein M is a nonzero positive integer; and identifying a second N-by-M pixel region of the processed second framebuffer data, wherein the first N-by-M pixel region and the second N-by-M pixel region correspond to a common display area for the publisher display and the viewer display; and determining, based on a matching analysis of the processed second framebuffer data for the defined pixel regions of the frame and the processed first framebuffer data for the defined pixel regions of the frame, a score that indicates shared screen display quality of the defined pixel regions of the frame rendered on the viewer display and the publisher display, wherein the score indicates an extent to which the first N-by-M pixel region of the processed first framebuffer data matches the second N-by-M pixel region of the processed second framebuffer data.

6. The method of claim 5, wherein a desktop sharing application is executed by a processor to support the desktop sharing session, and further comprising:

generating an output that indicates the shared screen display quality of the defined pixel regions of the frame rendered on the viewer display and the publisher display.

7. The method of claim 5, wherein:

capturing the first framebuffer data comprises obtaining the first framebuffer data at the viewer device;

separately capturing the second framebuffer data comprises: obtaining the second framebuffer data at the viewer device; and the adjusting resolution and determining are performed at the viewer device.

8. The method of claim 7, wherein:

establishing the desktop sharing session comprises: establishing a first data communication connection between the publisher device and the viewer device;

the method further comprises: establishing a second data communication connection between the publisher device and the viewer device; and the viewer device uses the second data communication connection to obtain the first framebuffer data.

9. The method of claim 5, wherein:

capturing the first framebuffer data comprises: obtaining the first framebuffer data at a server device that is communicatively coupled between the publisher device and the viewer device;

separately capturing the second framebuffer data comprises: obtaining the second framebuffer data at the server device; and the adjusting resolution and determining are performed at the server device.

10. The method of claim 5, further comprising:

increasing values of N and M to obtain larger first pixel regions of the processed first framebuffer data, and to obtain larger second pixel regions of the processed second framebuffer data; and determining supplemental scores that indicate an extent to which the larger first pixel regions match their corresponding larger second pixel regions, wherein the shared screen display quality is based on the score and the supplemental scores.

11. A computer-implemented device comprising a processor and a memory, wherein the memory comprises computer-executable instructions that, when executed by the processor, cause the device to:

capture first framebuffer data for a first frame of a display of a publisher device that shares the display with a viewer device during a desktop sharing session, wherein the first framebuffer data is captured from a first video framebuffer at the publisher device and the first framebuffer data corresponds to pixel-based information used to render the frame at the publisher display;

separately capture second frame-buffer data for a second frame of a display of the viewer device, wherein video content of the second frame corresponds to video content of the first frame, wherein the second framebuffer data is captured from a second video framebuffer at the viewer device and the second framebuffer data corresponds to pixel-based information used to render the frame at the viewer display;

based on the first framebuffer data differing in resolution from the second framebuffer data, adjusting resolution of the first framebuffer data, the second framebuffer data, or both the first framebuffer data and the second framebuffer data to generate processed first framebuffer data and processed second framebuffer data that exhibit a consistent display resolution so that the processed first framebuffer data and the processed second framebuffer data are capable of being compared to each other;

identify a first N-by-M pixel region of the processed first framebuffer data, wherein N is a nonzero positive integer, and wherein M is a nonzero positive integer;

identify a second N-by-M pixel region of the processed second framebuffer data to identify a common display area for the display of the publisher device and the display of the viewer device; and determine; based on a matching analysis of the plurality of first pixel regions of the processed first framebuffer data and the plurality of corresponding second pixel regions of the processed second framebuffer data, a score that indicates shared screen display quality of the frame rendered on the viewer display and the publisher display that indicates an extent to which the first N-by-M pixel region of the processed first framebuffer data match the second N-by-M pixel region of the processed second framebuffer data.

12. The device of claim 11, wherein:

the device is a server device that is communicatively coupled between the publisher device and the viewer device;

the server device obtains the first framebuffer data from the first video framebuffer of the publisher device; and the server device obtains the second framebuffer data from the second video framebuffer of the viewer device.

13. The device of claim 11, further comprising:

a desktop sharing application executed by the processor to support the desktop sharing session; and a shared screen verification application executed by the processor, wherein the shared screen verification application is distinct from the desktop sharing application, and wherein the shared screen verification application comprises the computer-executable instructions.

* * * * *